United States Patent
Sethi et al.

(10) Patent No.: US 6,269,353 B1
(45) Date of Patent: *Jul. 31, 2001

(54) SYSTEM FOR CONSTRUCTING DECISION TREE CLASSIFIERS USING STRUCTURE-DRIVEN INDUCTION

(76) Inventors: Ishwar K. Sethi, 1677 Heatherwood, Troy, MI (US) 48098; Jae H. Yoo, 110-302 Hangkanghyundae Apt. 28, Heukseok 2 Dong, Dong Jak-Gu, Seoul (KR), 156-072

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,681

(22) Filed: Nov. 26, 1997

(51) Int. Cl.$^7$ .................................................. G06E 1/00
(52) U.S. Cl. .............................. 706/20; 706/48; 706/52
(58) Field of Search .............................. 706/15, 16, 20, 706/25, 45–47, 55, 56, 52

(56) References Cited

U.S. PATENT DOCUMENTS

| | | | |
|---|---|---|---|
| 5,634,087 | * 5/1997 | Mammone et al. | 706/25 |
| 5,857,030 | * 1/1999 | Gaborski et al. | 382/132 |
| 6,035,274 | * 3/2000 | Kramer et al. | 704/270 |

OTHER PUBLICATIONS

Ivanova et al., "Initialization of Neural Networks by Means of Decision Trees" <online > <retrieved on Sep. 16, 1999>, Kowledge Based Systems, vol. 8, No. 6, pp. 333–344 <retrieved from the Internet URL: http://www/cacs.usl.edu/~mkubat/>, Dec. 1995.*

Quinlan, "Decision Trees and Decision–Making," IEEE Transactions on Systems, Man and Cybernetics, vol. 20, No. 2, pp. 339–346, Apr. 1990.*

Romero et al, "Comparison of Symbolic and Connectionist Approaches to Local Experts Integration," IEEE Technical Applications Conference and Workshops Northcon 95, pp. 105–110, Oct. 1995.*

Lure et al., "Improvement of Detection Accuracy in Digital Mammography with a Pruned Neural Net Optimized from Heuristic Decision Rules," IEEE International Conference on Neural Networks, 1996, vol. 2, pp. 757–761, Jun. 1996.*

Setiono et al., "Symbolic Representation of Neural Networks," Computer, vol. 29, No. 3, pp. 71–77, Mar. 1996.

Sakar et al., "Growing and Pruning Neural Tree Networks," IEEE Transactions on Computers, vol. 42, No. 3, pp. 291–299, Mar. 1993.

Yang et al., "Power System Distributed On–line Fault Section Estimation Using Detection Tree Based Nerual Nets Approach," IEEE Transactions on Power Delivery, vol. 10, No. 1, pp. 540–546, Jan. 1995.

* cited by examiner

*Primary Examiner*—Mark R. Powell
*Assistant Examiner*—Anil Khatri
(74) *Attorney, Agent, or Firm*—Harness, Dickey & Pierce, P.L.C.

(57) ABSTRACT

A computer-implemented apparatus and method for designing decision tree classifiers for use in artificial applications. A tree structure of fixed size with empty internal nodes, i.e. nodes without any splitting function, and labeled terminal nodes is first constructed. Using a collection of training vectors of known classification, a neural learning scheme combining backpropagation and soft competitive learning is then used to simultaneously determine the splits for each decision tree node. Compact trees are generated that have multifeature splits at each internal node which are determined on global rather than local basis. The computer-implemented apparatus and method consequently produces decision trees yielding better classification and interpretation of the underlying relationships in the data.

7 Claims, 11 Drawing Sheets

SYSTEM FOR CONSTRUCTING DECISION TREE CLASSIFIERS USING STRUCTURE-DRIVEN INDUCTION

BACKGROUND AND SUMMARY OF THE INVENTION

The present invention relates generally to computer-implemented artificial intelligence systems. More particularly, the present invention relates to computer-implemented neural networks with classification capability.

Figure 1:
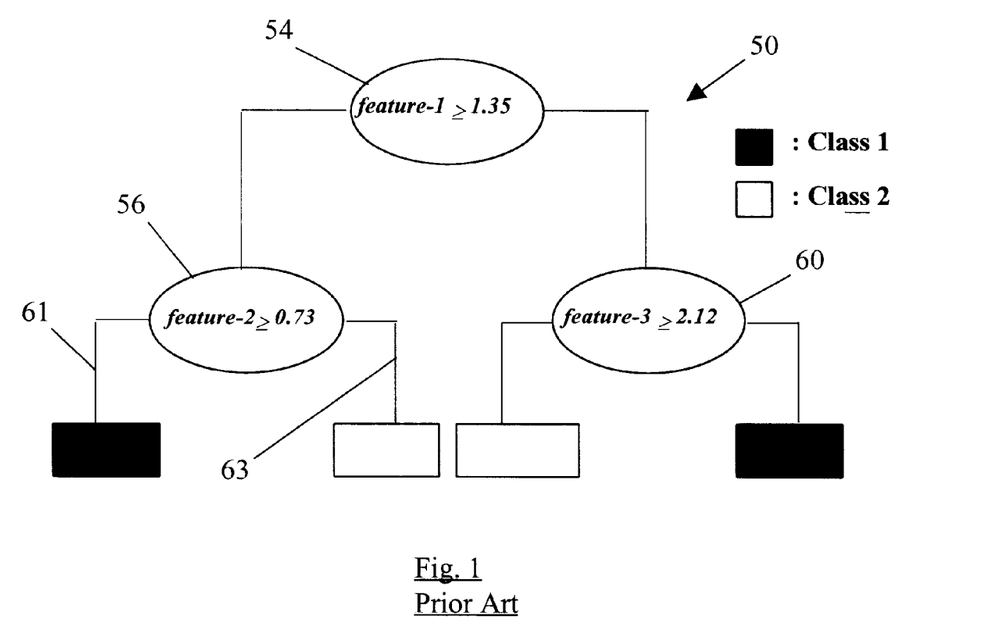
FIG. 1 is a tree diagram depicting an example of a tree classifier for a two-class problem.

Classification using decision trees is a widely used non-parametric method in pattern recognition for complex classification tasks. The decision tree methodology is also popular in machine learning as a means of automated knowledge acquisition for expert or knowledge-based systems. As shown in FIG. 1, a decision tree classifier 50 uses a series of tests or decision functions 54, 56, and 60 to determine the identity of an unknown pattern or object. The evaluation of decision functions 54, 56, and 60 is organized in such a way that the outcome of successive decision functions reduces uncertainty about the unknown pattern being considered for classification. Left branches (e.g., left branch 61) correspond to positive outcomes of the tests at the internal tree nodes. Right branches (e.g., right branch 63) correspond to negative outcomes of the tests at the internal tree nodes.

In addition to their capability to generate complex decision boundaries, it is the intuitive nature of decision tree classifiers as evident from FIG. 1 that is responsible for their popularity and numerous applications. Applications of the decision tree methodology include character recognition, power system monitoring, estimating software-development effort, and top-quark detection in high-energy physics among others.

While on occasional instances a decision tree classifier is determined heuristically, the common approach is to make use of a learning procedure to automatically configure a decision tree using a set of labeled pattern vectors, i.e. training examples or vectors. Several automatic decision tree induction algorithms exist for this purpose in pattern recognition and machine learning literature (for example, see, L. Breiman, J. Friedman, R. Olshen, and C. J. Stone, *Classification and Regression Tree*, Wadsworth Int'l Group, Belmont, Calif., 1984; and S. B. Gelfand, C. S. Ravishankar, and E. J. Delp, "An iterative growing and pruning algorithm for classification tree design," IEEE Trans. Pattern Anal. Mach. Intell., vol. 13, pp. 163–174, 1991).

However, most of these decision tree induction algorithms follow the top-down, divide-and-conquer strategy wherein the collection of labeled examples is recursively split to create example subsets of increasing homogeneity in terms of classification labels until predetermined terminating conditions are satisfied.

The top-down decision tree induction methodology basically consists of following components: 1) a splitting criterion to determine the effectiveness of a given split on training examples, 2) a method to generate candidate splits, 3) a stopping rule, and 4) a method to set up a decision rule at each terminal node. The last component is solved by following the majority rule. Different decision tree induction methods essentially differ in terms of the remaining three components. In fact, the differences are generally found only in the splitting criterion and the stopping rule.

Three decision tree induction methodologies in pattern recognition and machine learning literature are:

(1) AMIG (see, I. K. Sethi and G. P. R. Sarvarayudu, "Hierarchical classifier design using mutual information," IEEE Trans. Patt. Anal. Machine Intell., vol. PAMI-4, pp. 441–445, 1982);

(2) CART (see, L. Breiman, J. Friedman, R. Olshen, and C. J. Stone, *Classification and Regression Tree*, Wadsworth Int'l Group, Belmont, Calif., 1984); and (3) ID3 (see, J. R. Quinlan, "Induction of decision trees," Machine Learning, vol. 1, pp. 81–106, 1986).

AMIG and ID3, both use an information theory based measure, the average mutual information gain, to select the desired partitioning or split of training examples. Given training examples from c classes, and a partitioning P that divides them into r mutually exclusive partitions, the average mutual information gain measure of partitioning, I(P), is given as $$I(P) = \sum_{i=1}^{r} \sum_{j=1}^{c} p(r_i, c_j) \log_2 \frac{p(c_j/r_i)}{p(c_j)}$$

where $p(r_i, c_j)$ and $p(c_j/r_i)$, respectively, are the joint and conditional probabilities and $p(c_j)$ is the class probability. Using the maximum likelihood estimates for probabilities, the above measure can be written as $$I(P) = \sum_{i=1}^{r} \sum_{j=1}^{c} \frac{n_{ij}}{N} \log_2 \frac{n_{ij} N}{N_i n_j}$$

where $n_j$ is the number of training examples from class $c_j$, and $n_{ij}$ is the number of examples of class $c_j$ that lie in partition $r_i$. The quantity N is the total of all training examples of which $N_i$ lie in partition $r_i$. The split of training examples providing the highest value of the I(P) is selected. The CART procedure uses the Gini index of diversity to measure the impurity of a collection of examples. It is given as $$G = 1 - \sum_{j=1}^{c} p^2(c_j)$$

The split providing maximum reduction in the impurity measure is then selected. The advantage of this criterion is its simpler arithmetic.

To determine when to stop top-down splitting of successive example subsets is the other important part of a decision tree induction procedure. The AMIG procedure relies for stopping on the following inequality that specifies the lower limit on the mutual information, I(tree), to be provided by the induced tree $$I(tree) \geq -\sum_{j=1}^{c} p(c_j)\log_2 p(c_j) + p_{error}\log_2 p_{error} +$$

$$(1 - p_{error})\log_2(1 - p_{error}) - p_{error}\log_2(c-1)$$

where $p_{error}$ is the acceptable error rate. The tree growing stops as soon as the accumulated mutual information due to successive splits exceeds I(tree). CART and ID3 instead follow a more complex but a better approach of growing and pruning to determine the final induced decision tree. In this approach, the recursive splitting of training examples continues till 100% classification accuracy on them is achieved. At that point, the tree is selectively pruned upwards to find a best subtree according to some specified cost measure.

The generation of candidate splits at any stage of the decision tree induction procedure is done by searching for splits due to a single feature. For example in AMIG, CART, and ID3, each top-down data split takes either the form of "is $x_i \geq t$?" when the attributes are ordered variables or the form of "is $x_i$ true?" when the attributes are binary in nature. The reason for using single feature splits is to reduce the size of the space of legal splits. For example with n binary features, a single feature split procedure has to evaluate only n different splits to determine the best split. On the other hand, a multifeature split procedure must search through a very large number of Boolean combinations, $2^{2^n}$ logical functions if searching for all possible Boolean functions, to find the best split.

Due to single feature splits, the decision tree induction procedures in practice often create large unwieldy trees that translate into production rules or concept descriptions that are not concise and do not generalize well. Another deficiency of single feature splits is their relative susceptibility to noise in comparison with multifeature splits.

In addition to using only a single feature split scheme to determine successive splits of the training examples, the top-down induction procedures have no look-ahead component in their splitting strategy, i.e. the evaluation of the goodness of a split, single or multifeature, at any stage of partitioning does not take into account its effect on future partitions. This is a major drawback which in many instances leads to large decision trees which yield lower classification accuracy and do not clearly bring out the relationships present in the training examples. The set of labeled examples of Table 1 illustrate this point.

| $x_1$ | $x_2$ | $x_3$ | f |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 0 |
| 1 | 0 | 1 | 1 |
| 1 | 1 | 0 | 1 |
| 1 | 1 | 1 | 1 |

Figure 2A:
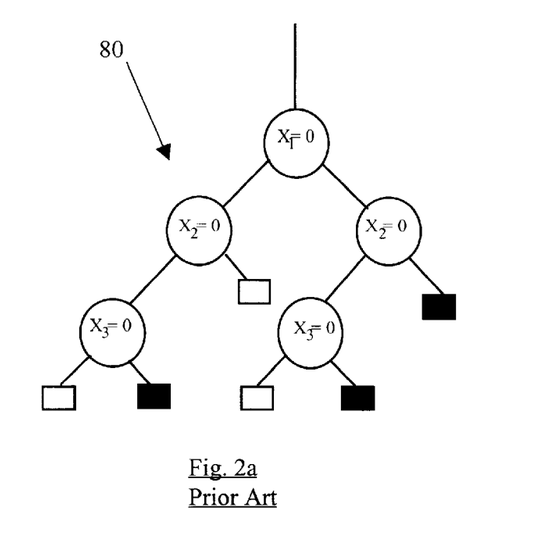
FIG. 2a–2b are decision trees using the AMIG/ID3 approach.
Figure 2B:
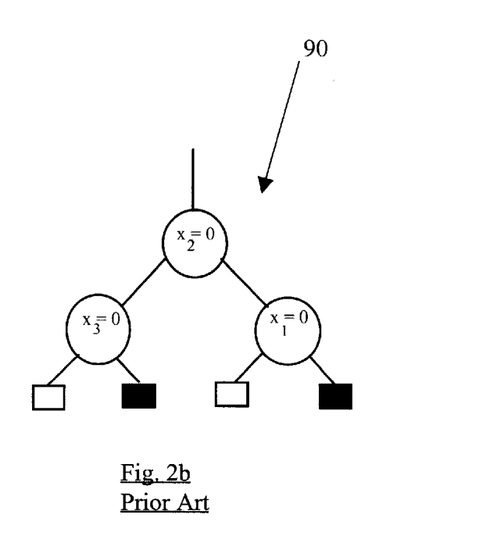

Using AMIG/ID3 tree induction procedure, feature $x_1$ or $x_3$ yield the best splitting measure value. Selecting $x_1$ and continuing on with the procedure, decision tree 80 of FIG. 2a is obtained. On the other hand, if feature $x_2$ is selected (which yields the worst splitting measure value at the root node according to the AMIG/ID3 criterion) decision tree 90 of FIG. 2b is obtained. Not only is decision tree 90 of FIG. 2b smaller than decision tree 80 of FIG. 2a, decision tree 90 also brings out clearly and concisely the relationship present in the data.

Although decision trees have been successfully used in many applications as mentioned above, problems exist that hamper their use and performance in many instances. These problems arise, among other reasons, due to the splitting step used in practice in the top-down tree induction process. As a result, several neural network based solutions have been proposed in recent years for the induction of decision tree classifiers (see, M. Golea and M. Marchand, "A growth algorithm for neural network decision trees," Europhysics Letters, vol. 12, pp. 205–210, 1990; and A. Sankar and R. J. Mammone, "Growing and pruning neural tree networks," *IEEE Trans. Computer*, Vol. 42, No. 3, pp. 291–299, 1993). These solutions are mainly concerned with providing a multifeature split capability to decision tree induction methods through neural learning algorithms.

Despite such efforts, an important weakness of the decision tree induction methodology still remains. This weakness in the methodology is due to the sequential nature of the induction procedure followed in current neural and non-neural decision tree methods, i.e. the successive splits are determined one after the other and none of the splitting criteria in practice has a look-ahead component.

Since the resurgence of artificial neural networks in early eighties, there have been several neural approaches for decision tree classification methodology. These previous approaches are mainly focused at providing multifeature split capability to the decision tree induction process. Many of these previous approaches were motivated by the topology problem of fully connected feedforward networks rather than as solutions to a decision tree induction problem.

A number of the neural approaches to determine multifeature splits in decision trees use Gallant's pocket algorithm for single perceptron training (see, for example, S. I. Gallant, "Optimal linear discriminants," Proc. 8th Int. Conf. Pattern Recognition, pp. 849–852, 1986). The pocket algorithm is a modification of the classical two-class perceptron learning rule that exploits its cyclic behaviour to determine an optimal separating hyperplane, i.e. a hyperplane providing minimum number of misclassifications, regardless of the separability of the training examples. The pocket algorithm consists of applying the perceptron learning rule with a random ordering of training examples. In addition to the current perceptron weight vector, the pocket algorithm maintains another weight vector, the so called pocket vector, that is the best linear discriminator found thus far. Whenever the performance of the current perceptron weight vector, measured in terms of the length of its correct classification streak, exceeds that of the pocket vector, it automatically replaces the pocket vector. This ensures that pocket vector is always the best discriminator at any training instance. The examples of the early work using pocket algorithm for induction of decision trees with multifeature capability include the perceptron tree of Utgoff and the neural tree of Golea and Marchand (see, P. E. Utgoff, "Perceptron trees: A case study in hybrid concept representation," Proc. Nat'l Conf. Artificial Intelligence, pp. 601–606, St. Paul, Minn., 1988; and M. Golea and M. Marchand, "A growth algorithm for neural network decision trees," Europhysics Letters, vol. 12, pp. 205–210, 1990).

Both of these approaches are considered to yield poor induction results when the training data consists of uneven populations. A reason for this lies in the use of correct classification streak as a performance measure for pocketing a weight vector. It has been shown that this performance measure has a tendency to favor a weight vector that consistently misclassifies all training examples of the minority class when the training data consists of uneven populations (see, P. E. Utgoff and C. E. Brodley, "An incremental method for finding multivariate splits for decision trees," Proc. 7th Int. Conf. Machine Learning, pp. 58–65, Austin Tex., June 1990). This drawback of pocket algorithm for decision tree was addressed by Sethi and Yoo (see, I. K. Sethi and J. H. Yoo, "Design of multicategory multifeature split decision trees using perceptron learning," *Pattern Recognition*, Vol. 27, No. 7, pp., 1994).

Although the use of neural learning has shown how to generate multifeature splits, the problem still remains with respect to the sequential nature of tree growing or the absence of any look-ahead component in determining tree splits.

The present invention overcomes these and other disadvantages found in previous approaches. In accordance with the teachings of the present invention, a computer-implemented apparatus and method is provided for constructing a decision tree for computer-implemented information processing. A tree structure of a predetermined size is constructed with empty internal nodes, including at least one terminal node and at least one internal node. Training vectors of predetermined classification are used to determine splits for each decision tree node. The training vectors include a back propagation component that determines the splits for each internal node. The training vectors include a competitive learning component that controls the number of terminal nodes thereby determining the effective size of the decision tree.

A feature of the present invention is that it generates compact trees that have multifeature splits at each internal node which are determined on global rather than local basis; consequently it produces decision trees yielding better classification and interpretation of the underlying relationships in the data. Moreover, Since the decision making in backpropagation networks is typically considered opaque, the present invention permits classification that has the feature of making apparent its decision making process while classifying an unknown example while maintaining a performance level similar to the backpropagation network.

For a more complete understanding of the present invention, its objects and advantages, reference may be had to the following specification and to the accompanying drawings.

BRIEF DESCRIPTION OF THE DRAWINGS

FIG. 4b is a neural network which is the mapped neural network of the tree of FIG. 4a;

DESCRIPTION OF THE PREFERRED EMBODIMENTS

Figure 3:
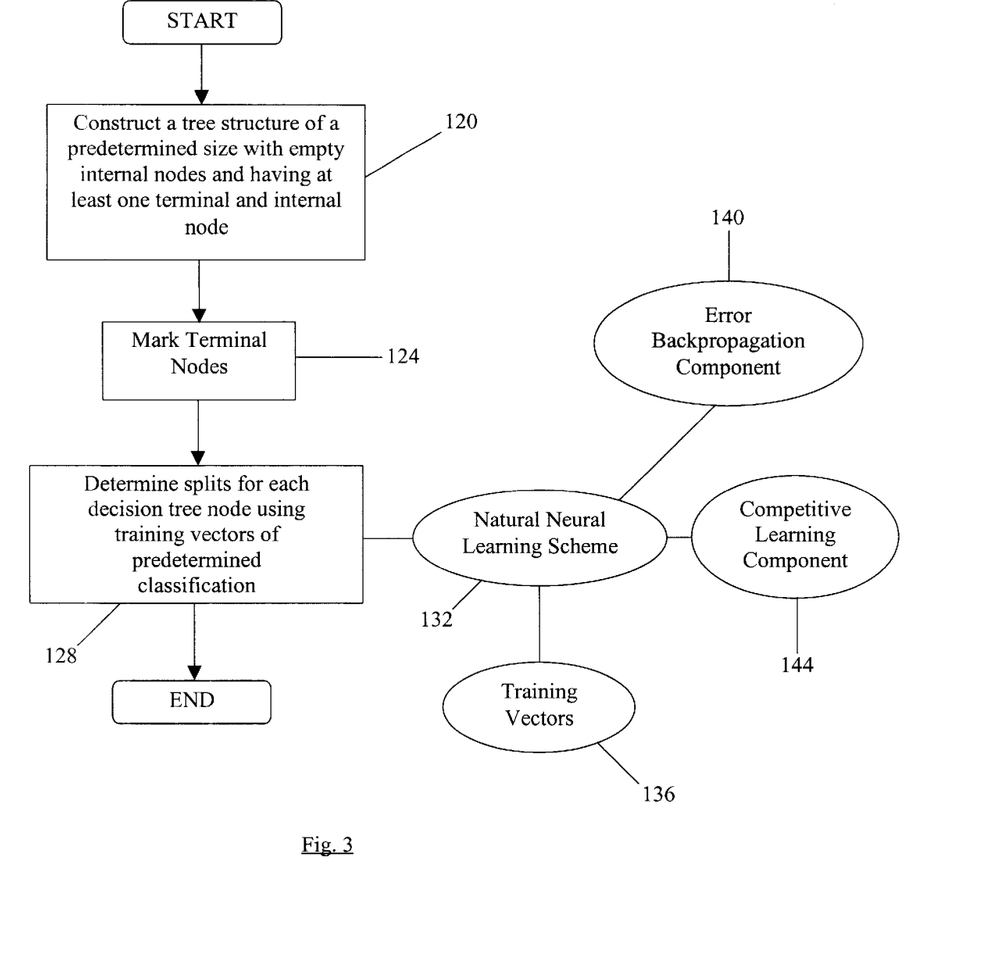
FIG. 3 is a flow chart depicting the system-level operations utilized in the structure-driven tree induction approach of the present invention.

FIG. 3 depicts the system-level functions of the present invention and how it incorporates a structure-driven induction method. First at block 120, a tree structure of fixed size with empty internal nodes, i.e. nodes without any splitting function, and labeled terminal nodes is assumed. Since the final tree structure is not known beforehand, the initial tree structure is always taken to be a complete binary tree of depth k, with L, $L=2^k$, terminal nodes. At block 124, the terminal nodes of the initial tree are marked alternately as class 1 (positive) or class 2 (negative) nodes leading to equal number of terminal nodes for both classes.

Figure 4A:
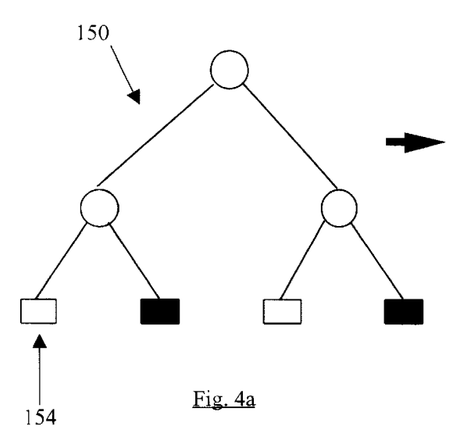
FIG. 4a is a tree depicting an empty binary tree of depth two.

FIG. 4a shows an example of an empty but labeled binary tree 150 for k=2. Shading of terminal nodes (shown generally at 154) represents class labels. For multiclass problems, multiple trees are used as shown later in the performance evaluation section.

With reference back to FIG. 3 at block 128, a neural learning scheme 132 using the available set of training vectors 136 of known classification and combining error backpropagation 140 with competitive learning 144 is then used to simultaneously determine suitable splits for each internal node of the starting tree. While the backpropagation component 140 of the learning scheme 132 determines the splits for internal nodes, the competitive component 144 is used to control the number of winning terminal nodes thus determining the effective tree size. The neural learning scheme 132 is carried out using a decision tree to neural network mapping in which each internal node of the decision tree corresponds to a neuron in the first or partitioning layer, and each terminal node corresponds to a neuron in the output or the ANDing layer.

Figure 4B:
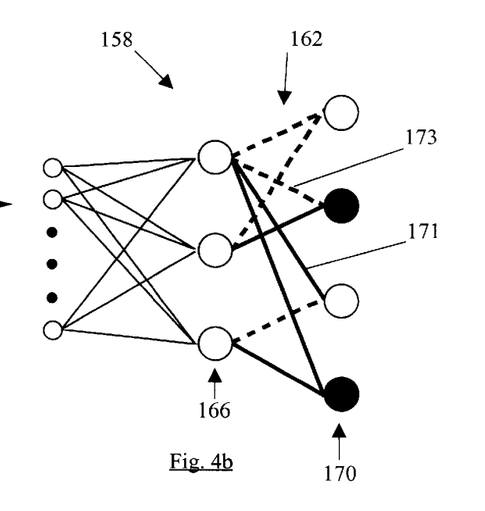

FIG. 4b shows an example of decision tree to neural network mapping 158 for decision tree 150 of FIG. 4a. As seen from FIG. 4b, connections 162 between partitioning layer 166 and output layer 170 are of fixed-excitatory or fixed-inhibitory type. The dark thick continuous lines (e.g., line 171) represent unit excitatory connections and the dark thick broken lines (e.g., line 173) represent unit inhibitory connections. The bias nodes and links have been omitted for clarity.

The bias weight to each neuron in the output layer is also kept fixed in such a way that each output layer neuron performs an AND operation on its inputs. For a complete binary tree of depth k, the bias weights lie within the range of (k−1, k). It is seen that the constraints on the bias and the synaptic weights on the output layer neurons ensure that there is only one output layer neuron with positive activation.

During the learning process, the neurons are provided with soft nonlinearity to permit the use of backpropagation. Once the learning is over, the soft nonlinearities of the partitioning layer neurons are converted to hard nonlinearities, and the mapped network is transformed back to obtain the decision tree. While such a replacement of nonlinearities can lead to a major change in performance in a regular feedforward network, the special architecture of the decision tree mapped neural network permits such a replacement without any significant change in the performance as illustrated by the examples are provided herein.

To illustrate how the present invention utilizes backpropagation and competitive learning, consider a mapped network corresponding to a complete binary tree of depth k. The present invention's approach of finding multifeature splits simultaneously can be then viewed as that of minimizing the error function E(W) defined as $$E(W) = \frac{1}{2}\sum_{i=1}^{N}\sum_{j=1}^{L}(d_{ij} - o_{ij})^2$$

where W denotes the weights of the first layer neurons of the mapped network, and $d_{ij}$ and $o_{ij}$, respectively are the desired (target) and the actual outputs of the $j^{th}$ neuron of the second layer of the mapped network for an augmented (n+1)-component input training vector $x_i$, i=1,N. Allowing for differentiability of the error finction, the backpropagation algorithm can be used to obtain the components of the weight matrix W and thus the splits. However, to carry out the application of the backpropagation process, the desired output is used for every output layer neuron of the mapped network for each input training vector. Ordinarily, it is not a problem in regular backpropagation networks which have only one neuron per pattern class in the output layer. The presence of several neurons per pattern class in the mapped network uses an indirect method of determining the desired response for each output layer neuron for a given input training vector.

To accomplish this, the present invention performs the following operations. For a given example of positive (negative) class, the neurons marked positive (negative) in the output layer are searched to find the neuron producing the highest response. If the neuron producing the highest response has positive activation, it is declared the winner for the input example and the desired output for this neuron is set to "target-winner" while the desired output for the rest of the neurons in the output layer is set to "target-loser." The numerical values of "target-winner" and "target-loser" depend upon the nature of the soft nonlinearity used during training.

For hyperbolic tangent nonlinearity, the "target-winner" value is tanh(1.0)–1.0, and the "target-loser" value is tanh(1.0−2k)+0.1. When the neuron producing the highest response has negative activation, no winner for the input example is declared and consequently no weight change is made. The present invention utilizes this rule to ensure that the replacement of soft nonlinearities with hard nonlinearities at the end of training doesn't change or create new winners on the learned examples.

Figure 5A:
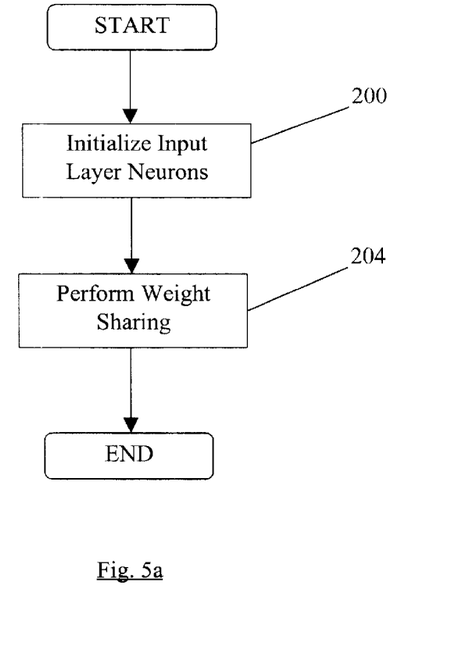
FIGS. 5a–5b are flow charts depicting the operations involved in preventing domination by a single neuron.

To prevent a single output layer neuron from dominating the competition to determine the desired output of the neurons in the output layer of the mapped network, the present invention utilizes the following two points with respect to competitive learning:

1. With respect to FIG. 5a, the weight vectors for all the input layer neurons are initialized to almost identical values at block 200. At block 204, these weight vectors share their correction after the presentation of each example during training. The amount of sharing decreases as learning progresses in the network. To carry out weight sharing, first the individual weights are modified in the usual fashion of the backpropagation algorithm. Next, a weight change value due to weight sharing is calculated by the following expression $$\Delta w_{jk} = \lambda \left( \frac{1}{L-1} \sum_{i=1}^{L-1} w_{ik} + (1-\lambda) w_{jk} \right)$$

where j is the input feature index, k the partitioning layer neuron index, and λ is the weight decay coefficient which falls inversely proportional to learning epoch. The sharing of weights allows a gradual movement of weight vectors of the input layer neurons thereby leading to fairer competition at the output layer.

Figure 5B:
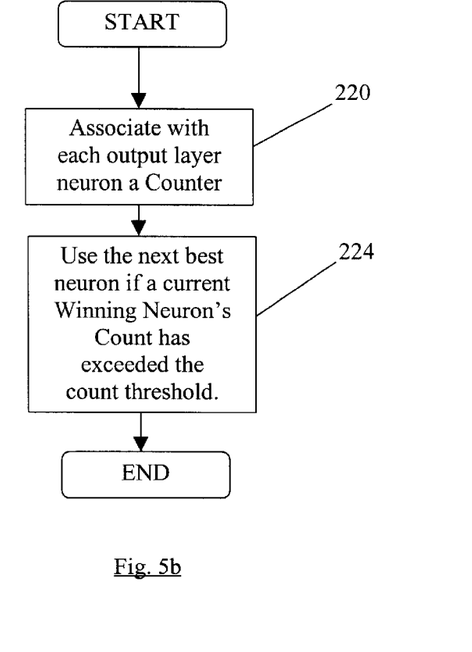

2. With respect to FIG. 5b, to achieve direct control over the competing nodes, the present invention uses the winner with a conscience approach by placing a limit on the number of wins for each output layer neuron of the mapped network. To keep a record of the number of wins, a counter, called the win-counter, is associated with each output layer neuron at block 220. These counters are reset at the beginning of each learning epoch. When a winning neuron is found to exceed the limit, the neuron with the next best response having the same class label is declared winner at block 224. The limit on the number of wins for each neuron of the output layer is determined in the following fashion. Consider the $j^{th}$ neuron of the output layer. Let label(j) represent its class label. The winning limit, limit(j), on the j-th neuron is then $$limit(j) = \frac{2}{g} N_{label(j)}$$

where g, $2^k \leq g \leq 2$, is an integer constant and $N_{label(j)}$ is the number of input examples whose class label is identical with the label of the $j^{th}$ neuron. The ratio 2/g is termed the growth factor as it determines the final tree size. For any value of g other than $g=2^k$, the sum of limits on the number of wins for the all output layer neurons exceeds N, the number of input examples. This indicates that when $g \neq 2^k$, there is a possibility that some neurons in the output layer may never win. Such neurons or nodes can be pruned at the end of training. Thus by varying the growth factor, the mapped network of depth k can be used to generate decision trees with 2 to $2^k$ terminal nodes.

Figure 6:
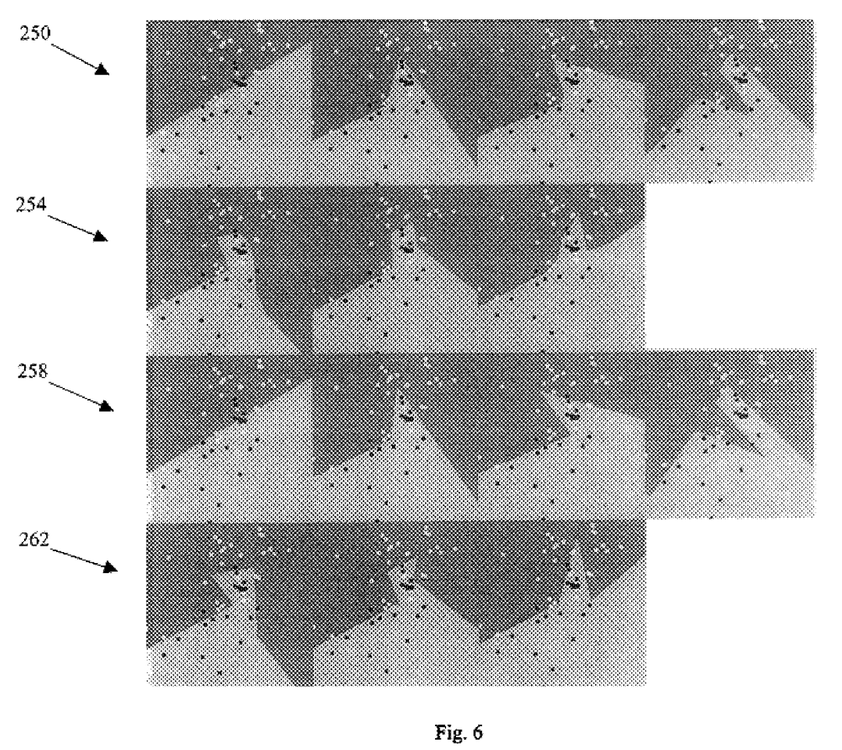
FIG. 6 depicts rows of decision trees that are either soft nonlinearity trees or hard nonlinearity trees.

An example of this is shown in FIG. 6 where the decision boundaries of seven decision trees generated with 2 to 8 terminal nodes are shown. These trees were obtained by controlling the growth factor 2/g. The points marked as white and black squares represent the training examples from two classes. Rows 250 and 254 show the classification boundary with soft nonlinearities, i.e. the soft decision tree. Rows 258 and 262 show the same for the hard decision tree, i.e. after replacing soft nonlinearities with hard nonlinearities. The respective values of the growth factor, 2/g, from left-to-right are 1.0, 0.667, 0.50, 0.40, 0.333, 0.286, and 0.25. By comparing the classification boundaries with soft and hard nonlinearities, it is also seen that the differences between the two sets of boundaries are small.

EXAMPLES

The following examples illustrate the results of the present invention as an average over ten trials. Where appropriate, two other decision tree induction methods, the single feature AMIG method and the multifeature, multicategory perceptron learning-based method are reported. These two methods are designated as SFDT and MFDT respectively in all the tables of results contained herein. In the examples provided herein, the classification performance was measured as $$P_{cc} = \frac{1}{c} \sum_{j=1}^{c} \frac{1}{n_j} \sum_{k=1}^{n_j} b_{jk}$$

where $b_{jk}$ is the Boolean-valued classification score of the $k^{th}$ sample of the $j^{th}$ class. This equally weighted class average of correct classification yields a more meaningful performance measure compared to the simple correct classification count measure because the performance of size one tree is always 1/c where c is the number of pattern classes. To compare different trees on the basis of their size and balance of the structure, average tree size was calculated for each case using the following relationship:

$$T_{avg} = \frac{1}{L}\sum_{j=1}^{L} depth_j$$

where L is the number of terminal nodes in a tree and $depth_j$ is the depth of the $j^{th}$ terminal node.

Figure 7A:
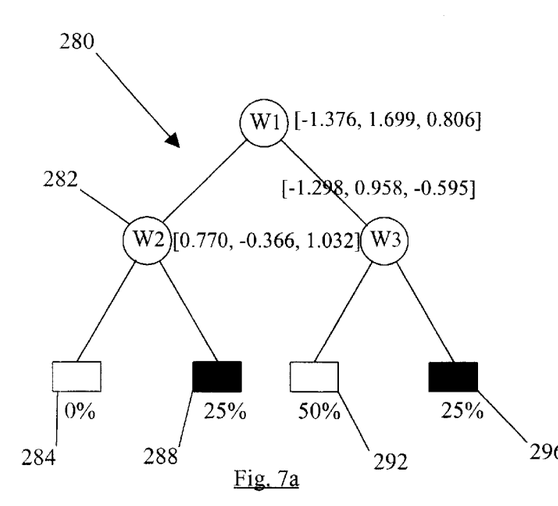
FIG. 7a is a tree used in an EX-OR example.

The first example was performed on two small Boolean problems: 1) the EX-OR problem, and 2) the illustrative example of Table 1 (as shown above). For the EX-OR problem, the present invention generated decision tree 280 of FIG. 7a. In tree 280, the split at each node (e.g., split 282) is expressed as the weight vector as found by the present invention. Rectangular boxes 284, 288, 292, and 296 represent the terminal nodes with boxes from same class having identical shading. The percentage below each terminal node (e.g., rectangular box 284) indicates the winning percentage of the corresponding neuron during training. Since each weight vector in tree 280 of FIG. 7a represents a threshold logic function, these weight vectors are converted into the corresponding Boolean function. Furthermore, the split due to $w_2$ is pruned from decision tree 280 as one of its descendent terminal nodes never wins. These two steps lead to decision tree 300 of FIG. 7b.

Figure 7B:
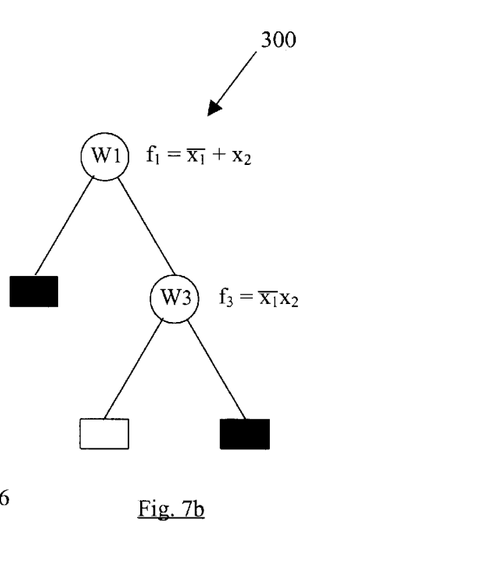
FIG. 7b is the tree of FIG. 7a after pruning and replacing the weight vectors with equivalent Boolean expressions.

It can be seen that decision tree 300 is the shortest possible tree for the EX-OR problem. Also tree 300 is able to bring out clearly the underlying Boolean expression of the EX-OR function.

Figure 8A:
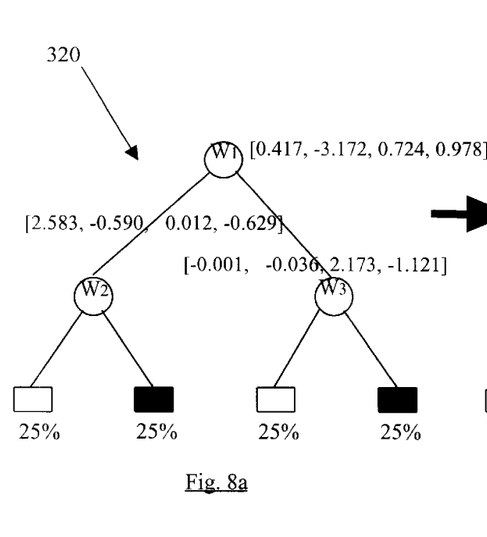
FIG. 8a is a tree using the data from Table 1 below.
Figure 8B:
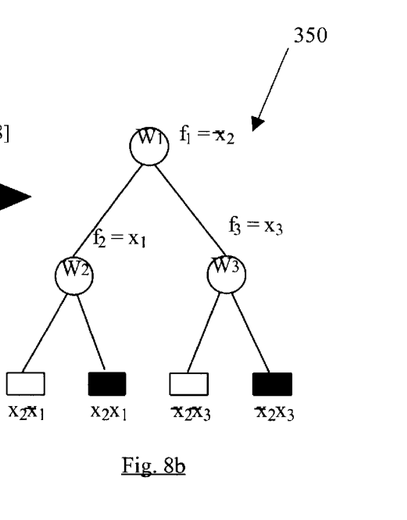
FIG. 8b is the tree of FIG. 8a after pruning and replacing the weight vectors with equivalent Boolean expressions.

For the example vectors of Table 1, the present invention generated the tree 320 of FIG. 8a which leads to the decision tree 350 of FIG. 8b after converting each weight vector into the corresponding Boolean expression. Decision tree 350 of FIG. 8b is substantially identical to 90 decision tree of FIG. 2b which was developed in a sequential manner picking the worst split at the root node. Once again, it is seen that decision tree 350 as generated by the present invention is compact and exhibits the relationship present in the training data.

The remaining examples involve pattern classification problems in higher dimensions. The second example was performed using the SONAR data (see, R. P. Gorman and T. J. Sejnowski, "Analysis of hidden units in a layered network trained to classify sonar targets," Neural Networks, Vol. 1, pp. 75–89, 1988). It contains 208 examples of sonar returns, 104 from a metallic cylinder, and 104 from a cylindrical rock. Each sonar return is represented as a 60-dimensional feature vector with each component representing the amount of returned energy within a particular frequency band. This data can be used in two ways: aspect-angle independent fashion and aspect angle dependent fashion. In our example, the latter mode was used. The entire data set was divided into two subsets of 104 training examples and 104 testing examples. Table 2 summarizes the results of this example. It also includes results reported by Gorman using a backpropagation network.

TABLE 2

Performance results using SONAR data

|  | Avg. size | Training | Testing |
|---|---|---|---|
| SFDT | 9, 3.33 | 98.07 | 75.19 |
| MFDT | 2, 1.0 | 97.95 | 79.95 |

TABLE 2-continued

Performance results using SONAR data

|  | Avg. size | Training | Testing |
|---|---|---|---|
| PRESENT INVENTION | 4, 2.0 | 98.08 | 87.60 |
| BP | 3 | 98.10 | 87.60 |

The average tree size column in Table 2 as well as in Tables 3–5 contains two entries. The first entry denotes the number of terminal nodes and the second entry denotes the value of $T_{avg}$ as defined earlier. The average tree size entry for the backpropagation row indicates the number of hidden units. Table 2 illustrates that the tree generated by the present invention outperforms the other two tree methods and provides a performance almost identical to the backpropagation network.

Figure 9:
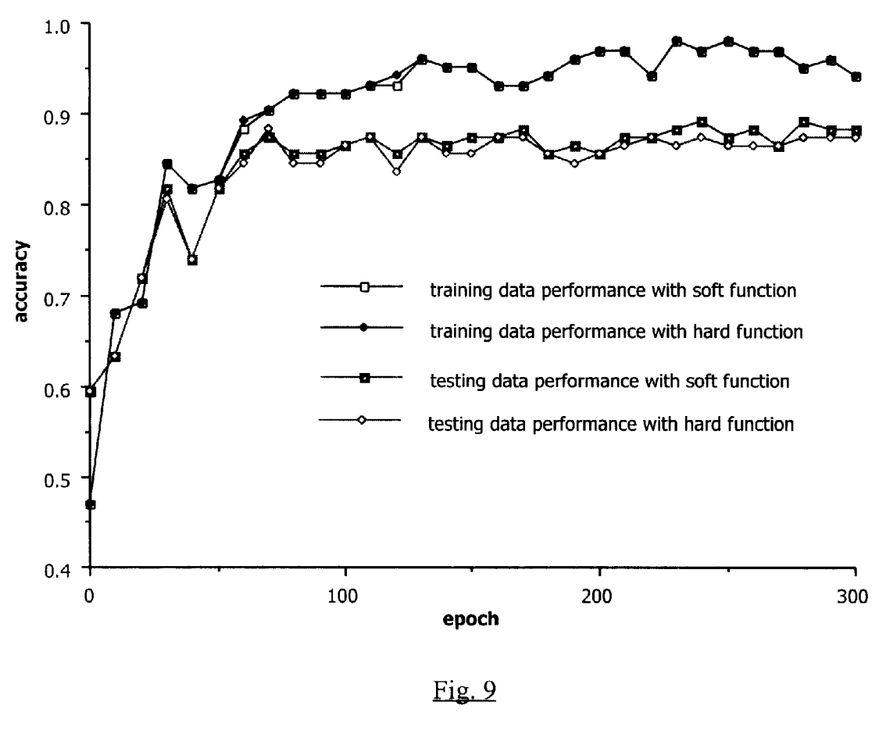
FIGS. 9–10 is an x-y graph depicting a set of plots exemplifying the learning performed by the present invention.
Figure 10:
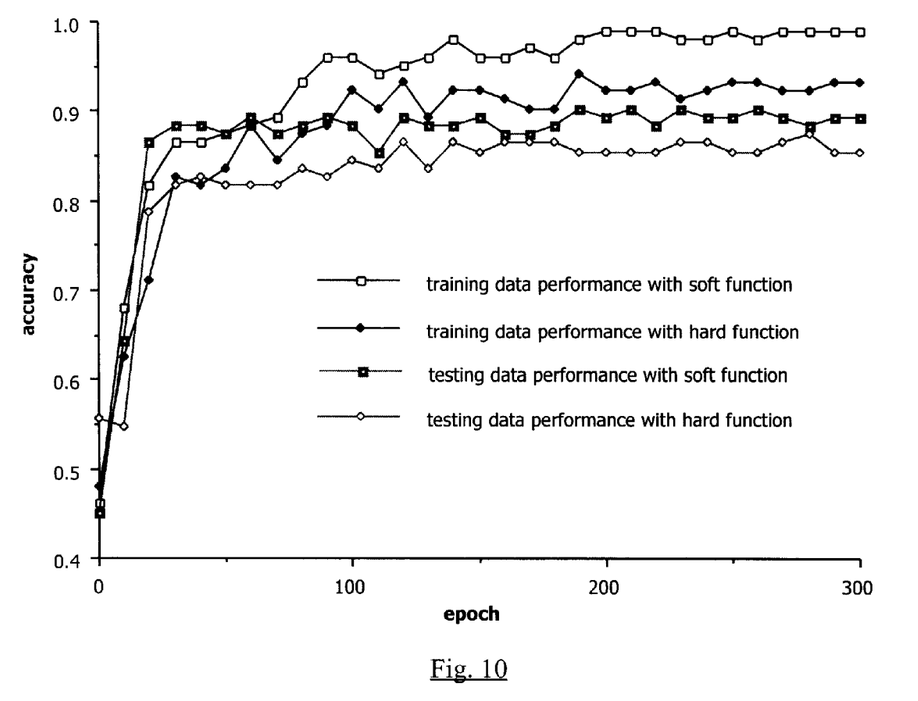

FIG. 9 illustrates how learning progresses in the present invention and the effect of replacing soft nonlinearities with hard nonlinearities. In the plots of FIG. 9, the accuracy of the tree of the present invention is shown on training and test data at different stages of learning. As these plots show, there is little difference in the accuracy of the tree of the present invention with soft and hard nonlinearities. For comparison sake, similar plots are shown for a fully connected backpropagation network in FIG. 10. In this case, there is a larger change in performance when soft nonlinearities are replaced by hard nonlinearities.

The third example illustrates how present invention operates in situations of uneven class populations. This example uses THINNING data set which was generated by the application of step one of the thinning algorithm due to Zhang and Suen (see, T. Y. Zhang and C. Y. Suen, "A fast parallel algorithm for thinning digital patterns," Comm. ACM, vol. 27, pp. 236–239, 1984).

The THINNING data set includes 256 8-bit feature vectors that represent various possibilities of an 8-neighborhood in a binary image with the central pixel of the neighborhood being one. The class label for each combination represents the thinning decision whether the central point of the neighborhood should be marked for deletion or not. Of the 256 combinations, there are 222 combinations for which the central point is marked for deletion; the remaining 34 combinations correspond to maintaining the central point.

The entire data set was used as the training data in this example. Table 3 summarizes the results for this example which also include results due to the backpropagation network.

TABLE 3

Performance results using THINNING data

|  | Avg. size | Training |
|---|---|---|
| SFDT | 45, 6.0 | 95.58 |
| MFDT | 15, 5.13 | 98.53 |
| PRESENT INVENTION | 12, 3.75 | 100.00 |
| BP | 12 | 100.00 |

These results illustrate the drawbacks of the traditional single feature decision tree methodology which generates a very large decision tree. The sequential multifeature split approach is outperformed by the present invention. Once again, the results for present invention and BP are substantially similar.

The last example addresses how the present invention operates in multicategory problems. Two different data sets of varying classification difficulty were used in this example.

Figure 11A:
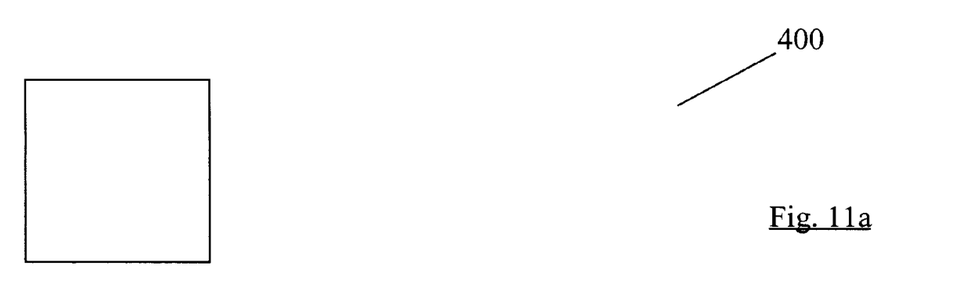
FIGS. 11a–11c are pixel representations of numerals involved in the DOT-MATRIX data examples.
Figure 11B:
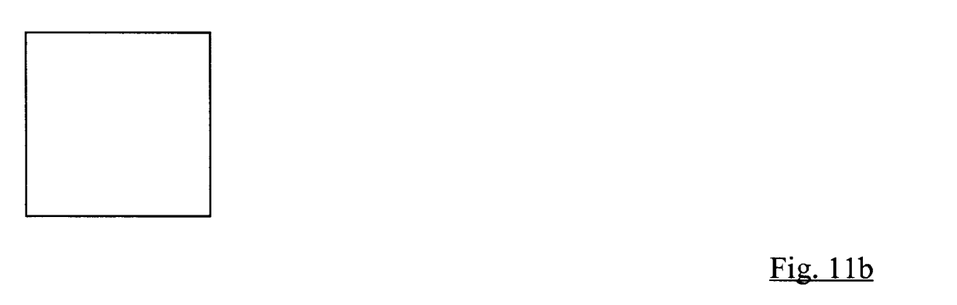
Figure 11C:
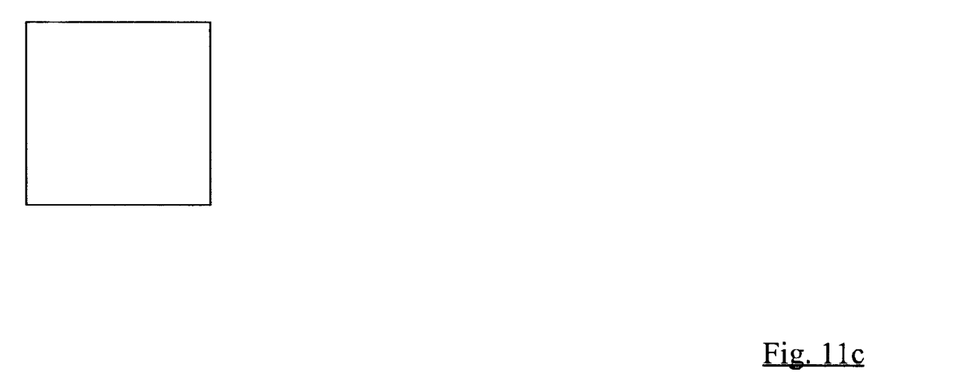

These are: (1) DOT-MATRIX data, and (2) GLASS data. The DOT-MATRIX data consists of 2,000 pattern vectors from 10 pattern classes. FIGS. 11a–11c show several of these pattern vectors. Each pattern vector in the data set (e.g., pattern vector 400) corresponds to a noisy version of 5×7 dot-matrix representation of one of the 10 numerals. The noise for each pixel position is assumed to be independent and there is 10% probability that a given pixel in any pattern vector is noisy. The entire data set is divided equally into training and testing subsets of 1,000 vectors each. The nearest neighbor recognition rate for this data is about 97%. FIG. 11a addresses the noise free vectors. FIG. 11b addresses the maximally corrupted vectors from the training set. FIG. 11c address the maximally corrupted vectors from the testing set.

The GLASS data set contains composition and refractive index information on a collection of 214 glass fragments from the Central Research Establishment of the Home Office Forensic Science Service, UK (see, I. W. Evett and E. J. Spiehler, "Rule induction in forensic science"). Each fragment type is represented by nine numerical features, eight of which convey the composition information in terms of percentages and the remaining feature conveys the refractory index information.

There are six glass types in the data with varying degrees of representation. The two most frequent glass types in the data set are non-float processed building window glass with 76 examples and the float processed building window glass with 70 examples. The other four glass types, float processed vehicle windows, containers, tableware, and headlamp, are represented by 17, 13, 9, and 29 examples, respectively. Since many classes have very small representation in the data, it was decided to use the same data for training as well as testing. The nearest neighbor recognition rate for GLASS data is about 81%.

To apply the present invention to data from m classes, the approach of class i versus the rest was followed by generating m decision trees, one per class. The results for DOT-MATRIX, and GLASS data following this approach are summarized in Tables 4 and 5 respectively.

TABLE 4

|  | Avg. size | Training | Testing |
|---|---|---|---|
| SFDT | 35, 5.33 | 88.02 | 78.57 |
| MFDT | 10, 3.4 | 100.00 | 96.31 |
| PRESENT INVENTION | 10*2, 1.0 | 99.60 | 99.10 |
| BP | 10 | 99.30 | 98.60 |

TABLE 5

Performance results using GLASS data

|  | Avg. size | Training |
|---|---|---|
| SFDT | 16, 4.4 | 82.71 |
| MFDT | 10, 3.60 | 85.83 |
| PRESENT INVENTION | 6*8, 3.00 | 91.12 |
| BP | 8 | 92.05 |

The entry 10*2 in the average size column for the present invention's row in Table 4 indicates that 10 decision trees, each with two terminal nodes were generated in this case. As these results show, the present invention outperforms the other two tree methods in each case, and gives performance substantially similar to that of the backpropagation network.

Overall, in each example provided herein, the present invention outperforms the existing single and multifeature split methods.

While the present invention has been described in its presently preferred form, it will be understood that the present invention is capable of modification without departing from the spirit of the present invention as set forth in the appended claims.

It is claimed:

1. A computer-implemented method for constructing a decision tree for computer-implemented information processing, comprising the steps of:
   constructing a tree structure of a predetermined size with empty internal nodes, including at least one terminal node and at least one internal node;
   using training vectors of predetermined classification to substantially simultaneously determine splits for each decision tree node, wherein:
   (a) said training vectors include a back propagation component that determines said splits for each internal node, and
   (b) said training vectors include a competitive learning component that controls the number of terminal nodes thereby determining the effective size of said decision tree.

2. The computer-implemented method of claim 1 further comprising the step of:
   using a computer-implemented neural learning scheme to determine the splits for each internal node through back propagation and to control the number of terminal nodes through competitive learning.

3. The computer-implemented method of claim 1 further comprising the step of:
   generating a map between components of a neural network and the nodes of the decision tree for use in constructing the decision tree.

4. The computer-implemented method of claim 1 further comprising the steps of:
   generating the training vectors through the neural network;
   transforming a plurality of the neural network components into nodes of the decision tree based upon the generated map.

5. A computer-implemented apparatus for constructing a decision tree for computer-implemented information processing, comprising:
   a tree structure data structure of a predetermined size with empty internal nodes, including at least one terminal node and at least one internal node;
   a neural network for generating training vectors,
   said training vectors include a back propagation component that determines said splits for each internal node, and
   said training vectors include a competitive learning component that controls the number of terminal nodes thereby determining the effective size of said decision tree.

6. The computer-implemented apparatus of claim 5 further comprising:
   a computer-implemented neural learning scheme to determine the splits for each internal node through back propagation and to control the number of terminal nodes through competitive learning.

7. The computer-implemented apparatus of claim 5 further comprising:
   a map between components of a neural network and the nodes of the decision tree for use in constructing the decision tree.

* * * * *